Jan. 6, 1942.  R. MARAIS  2,268,954
AIR COOLING DEVICE FOR INTERNAL COMBUSTION ENGINES
Filed Dec. 28, 1939  3 Sheets-Sheet 1

Inventor,
R. Marais
By: Glascock Downing Seebold
Attys.

Jan. 6, 1942.  R. MARAIS  2,268,954
AIR COOLING DEVICE FOR INTERNAL COMBUSTION ENGINES
Filed Dec. 28, 1939  3 Sheets-Sheet 2

Inventor,
R. Marais

By Glascock Downing & Seebold

Jan. 6, 1942.    R. MARAIS    2,268,954
AIR COOLING DEVICE FOR INTERNAL COMBUSTION ENGINES
Filed Dec. 28, 1939    3 Sheets-Sheet 3
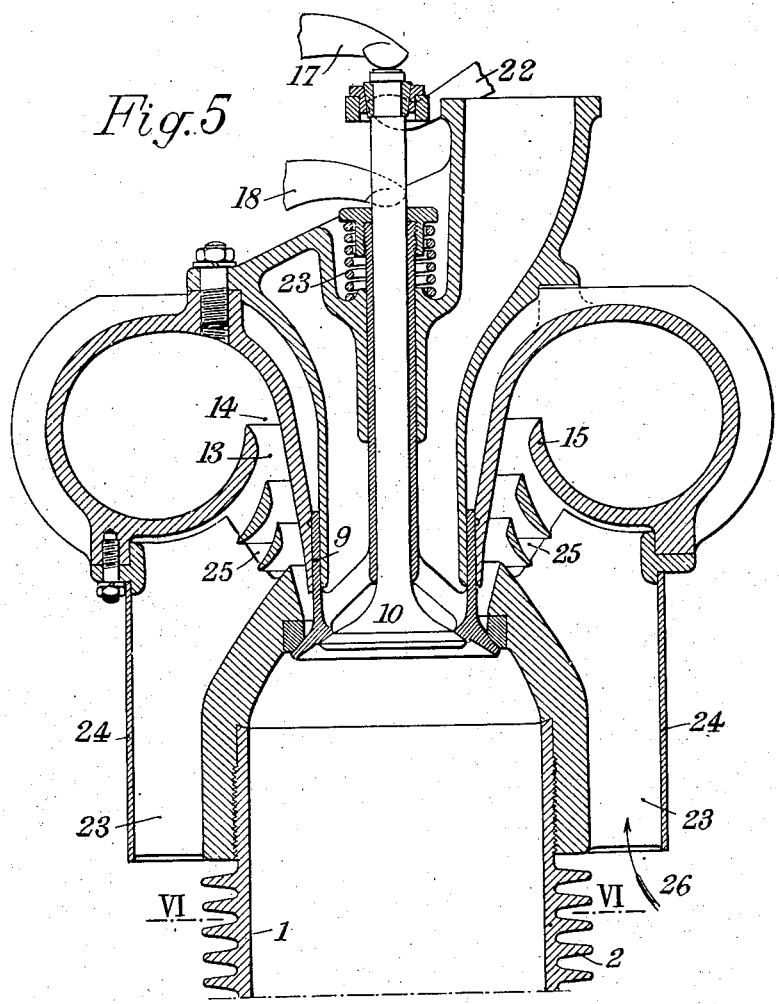
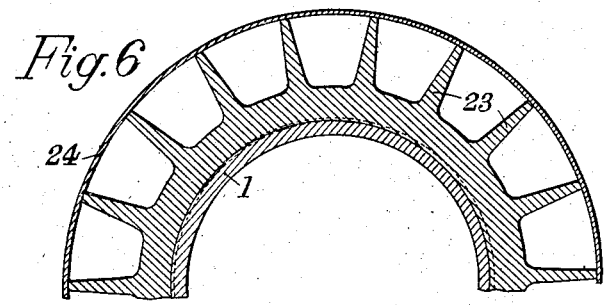
Inventor,
R. Marais
By Glascock Downing & Seebold
Attys.

Patented Jan. 6, 1942

2,268,954

UNITED STATES PATENT OFFICE 2,268,954

AIR COOLING DEVICE FOR INTERNAL COMBUSTION ENGINES

René Marais, Paris, France, assignor to Société Anonyme André Citroën, Paris, France Application December 28, 1939, Serial No. 311,433
In France December 29, 1938

2 Claims. (Cl. 123—171)

The invention has for object an air cooling device for internal combustion engines, which uses the kinetic energy of the exhaust gases for sucking the air necessary for cooling the engine.

The device is applicable, preferably, to engines comprising fins cast in one piece with the cylinder or secured on the latter.

The energy of the exhaust gases is directly used as soon as they issue from the combustion chamber, the driving nozzle being constituted by the annular space comprised between the exhaust valve and its seat.

The exhaust valve and the inlet valve are concentrically arranged according to the axis of the cylinder, the inlet being within the exhaust.

The exhaust gases spend their kinetic energy by drawing along the air necessary for cooling the engine, owing to convergent nozzles concentric with the valves.

The air is sucked in through said nozzles after passing over the fins of the cylinder.

The mixture of the gases with the air drawn along is then led to a chamber in the shape of a turbine volute.

From said chamber, said mixture is evacuated either directly in the atmosphere, or indirectly after passing through a silencer or muffler.

Fig. 5 is a vertical section of a modification.

Fig. 6 is a partial horizontal section made according to line VI—VI of Fig. 5.

Figure 1:
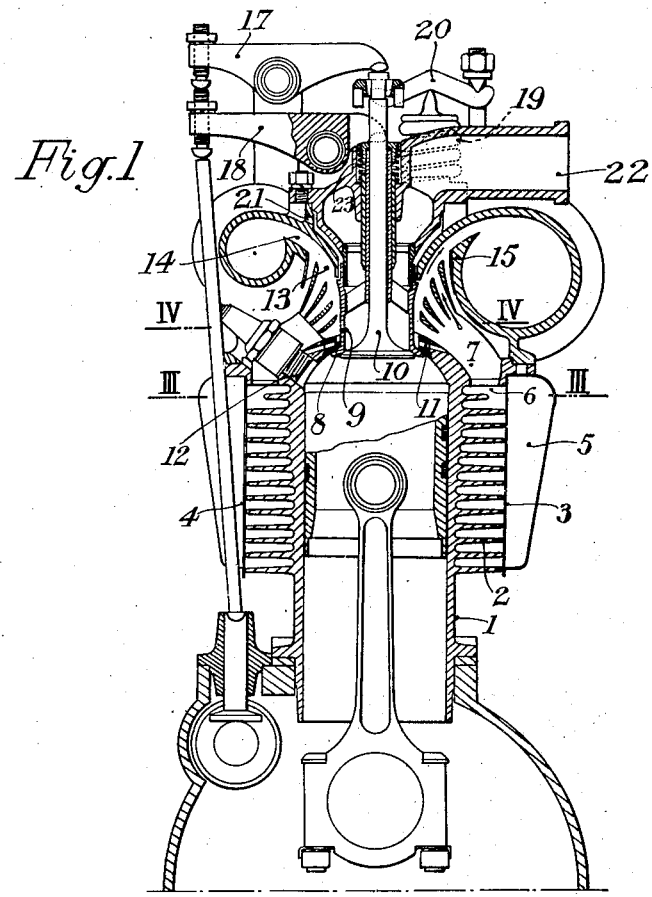
Fig. 1 illustrates a sectional elevation of an embodiment.
Figure 2:
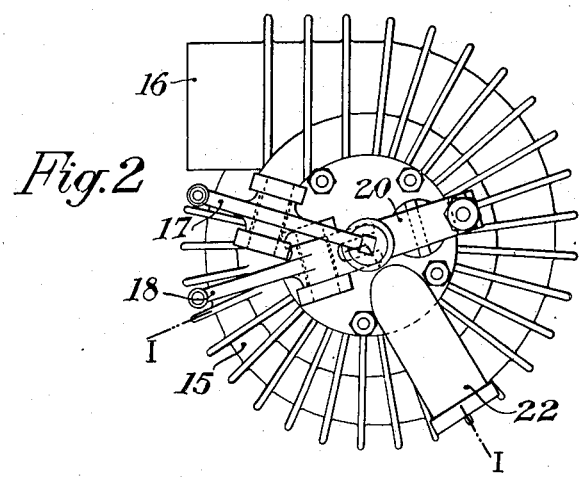
Fig. 2 is a plan view thereof.
Figure 3:
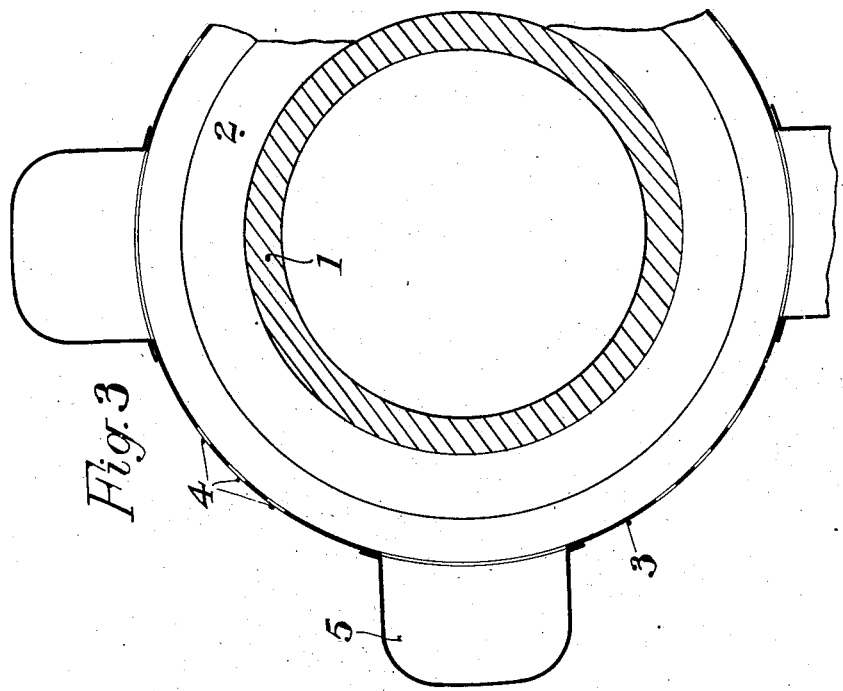
Figs. 3 and 4 illustrate horizontal sections made according to lines III—III and IV—IV of Fig. 1.
Figure 4:
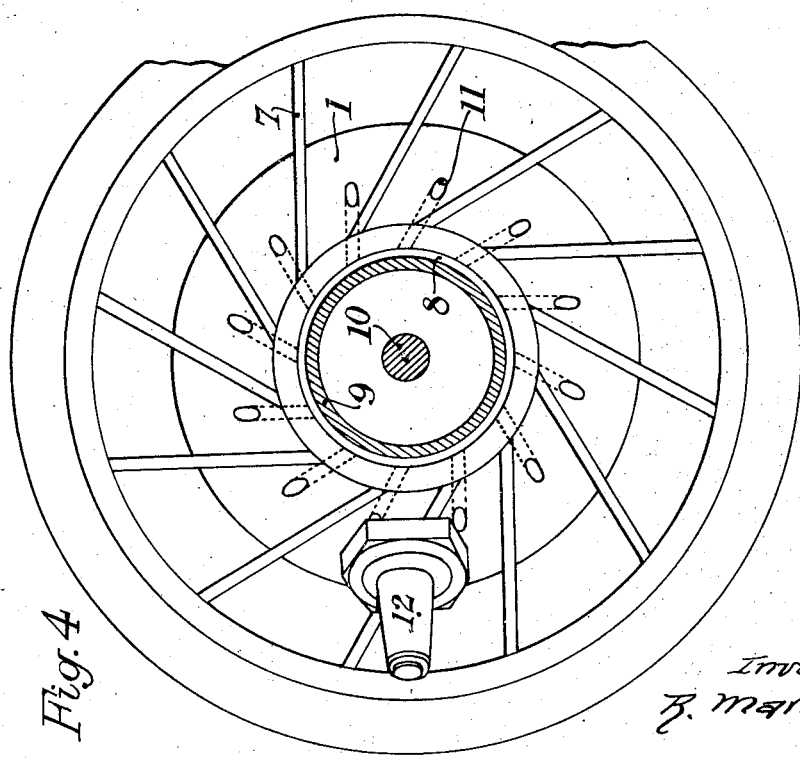

The form of construction illustrated in Figs. 1 to 4 comprises a cylinder 1 externally provided with fins 2. Around said cylinder is provided a casing 3 preferably made of sheet metal. This casing is provided with a series of opening 4 constituting external air intakes and a series of channels 5 which connect the fins to a suction chamber 6. This circular chamber has a certain number of air directing blades or vanes 7 adapted to impart a gyratory movement to the air sucked in.

The cylinder 1 is provided, at its upper part, and according to its axis, with an exhaust orifice 8 controlled by a poppet valve 9 which is internally and coaxially provided with the inlet valve 10. The inlet nozzle for the fresh gases is illustrated at 22.

The exhaust orifice 8 can be in direct communication with the suction chamber 6 through a series of holes 11.

The sparking plug is placed on one side, at 12.

Above the exhaust orifice are arranged a plurality of mixing nozzle 13 concentric with the valves 9 and 10. Said nozzles are convergent and have progressively increasing cross sections at their ends.

The last mixing nozzle is extended by an annular divergent channel 14. This channel is directed tangentially in the transverse direction, towards a chamber 15 of spiral shape. The cross sections of said chamber increase progressively up to the outlet nozzle 16.

This spiral shape is similar to that of a turbine stator, and several outlet nozzles can be provided, as in certain turbines.

A silencer or muffler can be connected to each outlet nozzle 16.

The valves are controlled by means of rockers 17 and 18. In the particular arrangement illustrated, both valves 9 and 10 are restored by one and the same spring 19 by means of an auxiliary lever 20. The poppet valve 9 is moreover pressed on its seat by a spring 23.

As the exhaust valve 9 is open slightly before the lower dead centre, the gases contained in the cylinder 1 expand as soon as they issue from the latter through the annular space comprised between said valve 9 and its seat.

At the end of the exhaust orifice 8 all the energy of the gases is converted into speed, and the suction of the air for cooling the cylinder takes place by driving it through the mixing nozzles 13. The curvature of the gaseous stream greatly facilitates this driving; the streams of the driving fluid, the speed of which is maximum on the concave side of the curvature, are in contact with the fluid streams to be driven along.

The air for cooling the engine is sucked in the atmosphere through the openings 4.

From these openings it passes on the fins 2 of the cylinder and cools them, then in the channels 5 which lead it into the suction chamber 6.

To the air thus reheated is imparted, in said chamber, a gyratory movement owing to the directing blades or vanes 7. This facilitates the suction by the exhaust gases after the passage of the air through the mixing nozzles 13, and contributes in cooling the cylinder head.

The cooling of the central part of the device can be eventually completed by the passage of air through the holes 21; likewise, the cooling of the outside of the exhaust valve 9 can be ensured by the passage of air through the holes 11.

The cooling of the inside of said valve 9 is effected owing to the passage of the fresh gases during the "admission" stroke.

The mixture "exhaust gases—air drawn along," after passing through the circular divergent channel 14 is tangentially admitted in the spiral or volute 15 which acts as speed damping device and mixer.

The mixture is then evacuated at slow speed into the atmosphere through the nozzle 16.

In the particular arrangement illustrated in Figs. 5 and 6, the cylinder head is secured by screwing on the cylinder. These two parts can be assembled in another manner or they can be made in one piece.

The cylinder head externally comprises a series of radial fins 23 directed according to generatrices;

These fins are surrounded by a cylindrical casing 24, preferably made of sheet metal.

The air sucked by the nozzles 25 enters at 26 and, canalised by the casing sweeps over the fins 23 before being evacuated, mixed with the exhaust gases according to the same method as that previously indicated.

It is to be understood that the embodiment above described is given only by way of example and not in a limiting sense and that the details or arrangement of the members can be modified.

I claim:

1. Apparatus for moving a cooling gaseous medium over a cylinder of an internal combustion engine having a cylinder head comprising, a valve in the cylinder head for evacuating combustion gases from the top of the cylinder and axially thereof, an annular casing surrounding the top portion of the cylinder having at least one inlet for admitting gaseous fluid medium, a housing formed with an outlet and arranged concentrically with respect to the axis of the cylinder above said casing, said housing having a spiral-shaped interior with the cross-section increasing towards said outlet, a series of nozzles arranged above the cylinder head and around said valve having outlet orifices adjacent the periphery of the outlet valve, means communicating the casing with said nozzles so that the cooling medium passes in contact with the cylinder and the cylinder head, and means directing the discharge of said nozzles into said housing.

2. Apparatus for moving a cooling gaseous medium over a cylinder of an internal combustion engine having a cylinder head comprising, a valve in the cylinder head for evacuating combustion gases from the top of the cylinder and axially thereof, an annular casing surrounding the top portion of the cylinder having at least one inlet for admitting gaseous fluid medium, a housing formed with an outlet and arranged concentrically with respect to the axis of the cylinder above said casing, said housing having a spiral-shaped interior with the cross-section increasing towards said outlet, a series of nozzles arranged above the cylinder head and around said valve having outlet orifices adjacent the periphery of the outlet valve, means communicating the casing with said nozzles so that the cooling medium passes in contact with the cylinder and the cylinder head, means directing the discharge of said nozzles into said housing, and baffles between the nozzles and said casing for imparting gyratory movement to the cooling medium.

RENÉ MARAIS.